(12) United States Patent
Yadav et al.

(10) Patent No.: US 12,218,507 B2
(45) Date of Patent: Feb. 4, 2025

(54) SYSTEM AND METHOD FOR OPERATING A POWER DISTRIBUTION SYSTEM

(71) Applicant: GE AVIATION SYSTEMS LLC, Grand Rapids, MI (US)

(72) Inventors: Joginder Yadav, Bangalore (IN); Pradeep V, Bangalore (IN)

(73) Assignee: GE Aviation Systems LLC, Grand Rapids, MI (US)

( * ) Notice: Subject to any disclaimer, the term of this patent is extended or adjusted under 35 U.S.C. 154(b) by 1 day.

(21) Appl. No.: 18/174,291

(22) Filed: Feb. 24, 2023

(65) Prior Publication Data
US 2024/0113525 A1 Apr. 4, 2024

(30) Foreign Application Priority Data
Sep. 30, 2022 (IN) .............................. 202211056310

(51) Int. Cl.
H02J 3/38 (2006.01)
H02J 3/14 (2006.01)
H02J 13/00 (2006.01)

(52) U.S. Cl.
CPC .............. H02J 3/381 (2013.01); H02J 3/14 (2013.01); H02J 13/00016 (2020.01); *B64D 2221/00* (2013.01); *H02J 2310/44* (2020.01)

(58) Field of Classification Search
CPC ........ H02J 3/381; H02J 3/14; H02J 13/00016; H02J 2310/44; B64D 2221/00
See application file for complete search history.

(56) References Cited

U.S. PATENT DOCUMENTS

| | | | |
|---|---|---|---|
| 9,673,863 B2 | 6/2017 | Mitchell et al. | |
| 10,153,807 B1 | 12/2018 | Shi | |
| 10,291,287 B2 | 5/2019 | Kornek-Percin et al. | |
| 10,305,543 B2 | 5/2019 | Guillot | |
| 11,108,750 B2 | 8/2021 | Nguyen et al. | |
| 2017/0063151 A1* | 3/2017 | Freitag | H02J 9/002 |
| 2019/0052078 A1* | 2/2019 | Krenz | H02J 3/38 |
| 2019/0245583 A1 | 8/2019 | Trebosc et al. | |
| 2019/0305822 A1 | 10/2019 | Bouchet et al. | |
| 2020/0028539 A1 | 1/2020 | Nguyen et al. | |
| 2020/0103445 A1* | 4/2020 | Medina Garcia | G01R 31/58 |

FOREIGN PATENT DOCUMENTS

| | | | |
|---|---|---|---|
| DE | 19705643 A1 | 8/1998 | |
| EP | 1643658 A1 | 4/2006 | |
| EP | 1956726 A1 | 8/2008 | |
| EP | 2028769 B1 | 5/2016 | |
| EP | 3041152 B1 | 9/2017 | |

* cited by examiner

*Primary Examiner* — Jared Fureman
*Assistant Examiner* — Esayas G Yeshaw
(74) *Attorney, Agent, or Firm* — McGarry Bair PC

(57) ABSTRACT

A method and aircraft power distribution system includes a power distribution bus supplying power along an electrical line, a primary communication module including a primary transceiver and a primary controller, and a plurality of secondary communication modules including a secondary transceiver communicatively coupled to the primary transceiver and a secondary controller communicatively coupled to the secondary transceiver.

18 Claims, 4 Drawing Sheets

SYSTEM AND METHOD FOR OPERATING A POWER DISTRIBUTION SYSTEM

CROSS-REFERENCE TO RELATED APPLICATION(S)

This application claims priority to Indian Patent Application No. 202211056310, filed Sep. 30, 2022, which is incorporated herein by reference in its entirety.

TECHNICAL FIELD

The disclosure relates to a method and system for operating a power distribution system, and more specifically for communications over an aircraft power distribution system.

BACKGROUND

Electrical power systems, such as those found in an aircraft power distribution system, employ power generating systems or power sources, such as generators, for generating electricity for powering the systems and subsystems of the aircraft. As the electricity traverses electrical bus bars to deliver power from power sources to electrical loads, power distribution nodes dispersed throughout the power system ensure the power delivered to the electrical loads meets the designed power criteria for the loads. Power distribution nodes can, for instance, further provide switching operations to selectively enable or disable the delivery of power to particular electrical loads, depending on, for example, available power distribution supply, criticality of electrical load functionality, or aircraft mode of operation, such as take-off, cruise, or ground operations.

BRIEF DESCRIPTION OF THE DRAWINGS

A full and enabling disclosure of the present description, including the best mode thereof, directed to one of ordinary skill in the art, is set forth in the specification, which makes reference to the appended figures, in which.

DETAILED DESCRIPTION

Figure 1:
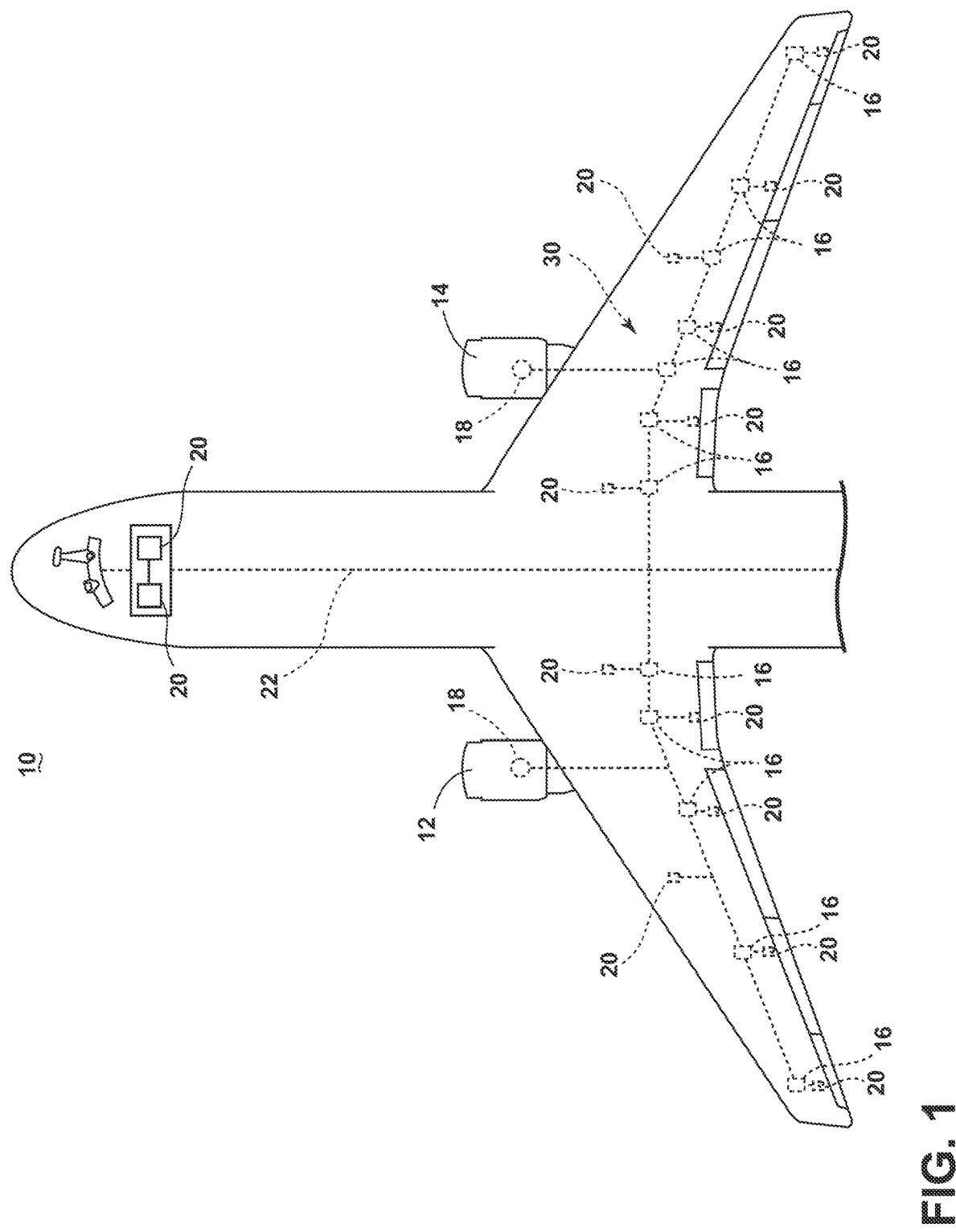
FIG. 1 is a top-down schematic view of an aircraft with a power distribution system in accordance with various aspects described herein.

Aspects of the present disclosure are described herein in the context of a power source in an aircraft, which enables production of electrical power from an energy source such as a turbine engine, jet fuel, hydrogen, batteries, etc. However, it will be understood that the disclosure is not so limited and has general applicability to power distribution systems in non-aircraft applications, including other mobile applications and non-mobile industrial, commercial, and residential applications. For example, applicable mobile environments can include an aircraft, spacecraft, space-launch vehicle, satellite, locomotive, automobile, etc. Commercial environments can include manufacturing facilities or power generation and distribution facilities or infrastructure.

Traditional power distribution systems can include a power source electrically coupled to a primary distribution network or power bus, which can supply power to a secondary node or secondary distribution network coupled to various electrical loads. A communication system can further be included wherein communication modules can transmit data to the various electrical loads.

Aspects of the disclosure provide for a smart power distribution system wherein a primary communication module can communicate with one or more secondary communication modules in a data over power transmission system. In an exemplary implementation, the primary communication module includes a primary transceiver and primary controller, and the secondary communication modules include solid-state circuit breaker (SSCB) nodes with integrated transceivers. The SSCB nodes can be connected to a common power bus and supply power to secondary loads, where each SSCB node can receive and transmit data through the power bus. The primary controller can control switching the SSCB nodes on or off, and can also monitor each SSCB node's load current and voltage.

Aspects of the disclosure additionally provide for a method for communication over such a system wherein a primary communication module determines a need for changing a signal characteristic, such as a communication frequency, and transmits an instruction to change the signal characteristic to the one or more secondary communication modules. Aspects of the disclosure further provide for methods of validating communication between primary and secondary communication modules, as well as re-establishing communication with a dropped secondary communication module. For instance, the communication performance can depend on the channel frequency response as well as AC impedances of loads connected to the bus. Because power network connections can be highly time-variable due to SSCB load switchings, there may arise situations of communication interference at certain SSCB nodes at a particular carrier frequency due to noise resulting from switching power supplies, complex resonances, or the like. Such a highly dynamic load network leads to a need for quickly and optimally selecting a communication frequency between the primary controller and SSCB nodes to ensure signal integrity at all nodes. Communication performance can be dynamically measured or evaluated by the primary controller, and a new frequency can be selected based on such performance determinations.

As used herein, the term "set" or a "set" of elements can be any number of elements, including only one. As used herein, the term "upstream" refers to a direction that is opposite the electrical, power, or current flow direction, and the term "downstream" refers to a direction that is in the same direction as the electrical, power, or current flow direction.

Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

Additionally, while terms such as "voltage", "current", and "power" can be used herein, it will be evident to one skilled in the art that these terms can be interrelated when describing aspects of the electrical circuit, or circuit operations.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus. Additionally, as used herein, "electrical connection" or "electrically coupled" can include a wired or wireless connection. The exemplary drawings are for purposes of illustration only and the dimensions, positions, order and relative sizes reflected in the drawings attached hereto can vary.

Additionally, as used herein, a "controller" or "controller module" can include a component configured or adapted to provide instruction, control, operation, or any form of communication for operable components to effect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile or non-transient, or non-volatile memory.

Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein. In another non-limiting example, a control module can include comparing a first value with a second value, and operating or controlling operations of additional components based on the satisfying of that comparison. For example, when a sensed, measured, or provided value is compared with another value or range, including a stored or predetermined value or range, the satisfaction of that comparison can result in actions, functions, or operations controllable by the controller module. As used herein, the term "satisfies" or "satisfaction" of a comparison between a first value and a second value can refer to a determination of whether the first value exceeds the second value, or does not exceed the second value, or is equal to the second value, such that the comparison is "true" when satisfied. In addition, as used herein, the term "satisfies" or "satisfaction" of a comparison between a first value and a value range will refer to a determination that the first value is within the value range, such that the comparison is "true" when satisfied. It will be understood that such a determination may easily be altered to be satisfied by a positive/negative comparison or a true/false comparison. Example comparisons can include comparing a sensed or measured value to a threshold value or threshold value range.

As used herein, a controllable switching element, or a "switch" is an electrical device that can be controllable to toggle between a first mode of operation or first mode, wherein the switch is "closed" intending to transmit current from a switch input to a switch output, and a second mode of operation or second mode, wherein the switch is "open" intending to prevent current from transmitting between the switch input and switch output. In non-limiting examples, connections or disconnections, such as connections enabled or disabled by the controllable switching element, can be selectively configured to provide, enable, disable, or the like, an electrical connection between respective elements.

The disclosure can be implemented in any electrical circuit environment having a switch. A non-limiting example of an electrical circuit environment that can include aspects of the disclosure can include an aircraft power system architecture, which enables production of electrical power from at least one spool of a turbine engine, such as a gas turbine engine, and delivers the electrical power to a set of electrical loads via at least one switch. One exemplary implementation can include a solid state power controller (SSPC) switching device, such as a silicon, silicon carbide (SiC) or Gallium Nitride (GaN) based, high power switch, in non-limiting examples. SiC or GaN can be selected based on their solid state material construction, their ability to handle high voltages and large power levels in smaller and lighter form factors, and their high speed switching ability to perform electrical operations very quickly. Another exemplary implementation can include a field-effect transistor (FET) switch, such as a metal-oxide-semiconductor field effect transistor (MOSFET) switch, which can be controlled by an applied voltage on the switch. Additional switching devices or additional silicon-based power switches can be included.

Referring now to FIG. 1, an aircraft 10 is shown having at least one turbine engine, shown as a left engine system 12 and a right engine system 14. Alternatively, the power system can have fewer or additional engine systems. The left and right engine systems 12, 14 can be substantially identical.

The left and right engine systems 12, 14 can include at least one power source, such as a generator 18. The left and right engine systems 12, 14 can further include another respective power source, for instance a second electric machine, a second generator, a battery power source, or the like. Non-limiting aspects of the disclosure can be included wherein, for example, the left engine system 12 includes a first generator 18 as a primary power source and a secondary generator as a secondary, back-up, or redundant power source.

The aircraft 10 can also include power-consuming components or electrical loads 20, such as for instance, an actuator load, flight critical loads, or non-flight critical loads. The electrical loads 20 can be located anywhere inside the aircraft 10.

An exemplary power distribution system 30 is provided for electrically coupling the electrical loads 20 with at least one of the generators 18. The exemplary power distribution system 30 can include, for instance, a power distribution bus 22 (also referred to herein as "power bus 22"), such as a power transmission line or bus bar, as well as one or more power distribution nodes 16. In this manner, the power distribution system 30 and power distribution bus 22 can form part of an avionics system for the aircraft 10.

The aircraft 10 can also include a set of supplemental power sources (not shown in FIG. 1) selectably connectable with the power distribution bus 22, and operable to provide at least a portion of primary power, supplemental power, redundant power, backup power, emergency power, or the like. Non-limiting examples of such supplemental power sources can include, but are not limited to, dischargeable or rechargeable sources of electrical energy, such as fuel cells, batteries, capacitors, supercapacitors, energy source "banks" of a set of devices, or any other source of electrical power. Such a set of supplemental power sources can provide power to the power distribution bus 22, and thus, the power distribution nodes 16 or the electrical loads 20.

During typical operations of the aircraft 10, the operating left and right engine systems 12, 14 provide mechanical energy which can be extracted, typically via a spool, to provide a driving force for the generators 18. The generators 18, in turn, generate power, such as AC or DC power, and provide the generated power to the power distribution bus 22, which delivers the power to the electrical loads 20 positioned throughout the aircraft 10. Furthermore, during typical operations of the aircraft 10, the set of supplemental power sources can be selectably connected with the power distribution bus 22, and operable to provide primary or supplemental power to a subset of the electrical loads 20.

Example power distribution management functions can include, but are not limited to, selectively enabling or disabling the delivery of power to particular electrical loads 20, depending on, for example, available power distribution supply, criticality of electrical load 20 functionality, or aircraft mode of operation, such as take-off, cruise, or ground operations. During emergency or inadequate periods of electrical power generation, including but not limited to engine or generator failure, at least one of the supplemental power sources can be operated, enabled, or connected for providing power to the electrical loads 20. Additional management functions can be included.

It will be understood that while aspects of the disclosure are shown in an aircraft environment of FIG. 1, the disclosure is not so limited and can have applicability in a variety of environments. For example, while this description is directed toward a power system architecture in an aircraft, aspects of the disclosure can be further applicable to provide power, supplemental power, emergency power, essential power, or the like, in otherwise non-emergency operations, such as takeoff, landing, or cruise flight operations.

Furthermore, the number of, and placement of, the various components depicted in FIG. 1 are also non-limiting examples of aspects associated with the disclosure. For example, while various components have been illustrated with relative position of the aircraft 10 (e.g. the electrical loads 20 on the wings of the aircraft 10, etc.), aspects of the disclosure are not so limited, and the components are not so limited based on their schematic depictions. Additional aircraft 10 configurations are envisioned.

Figure 2:
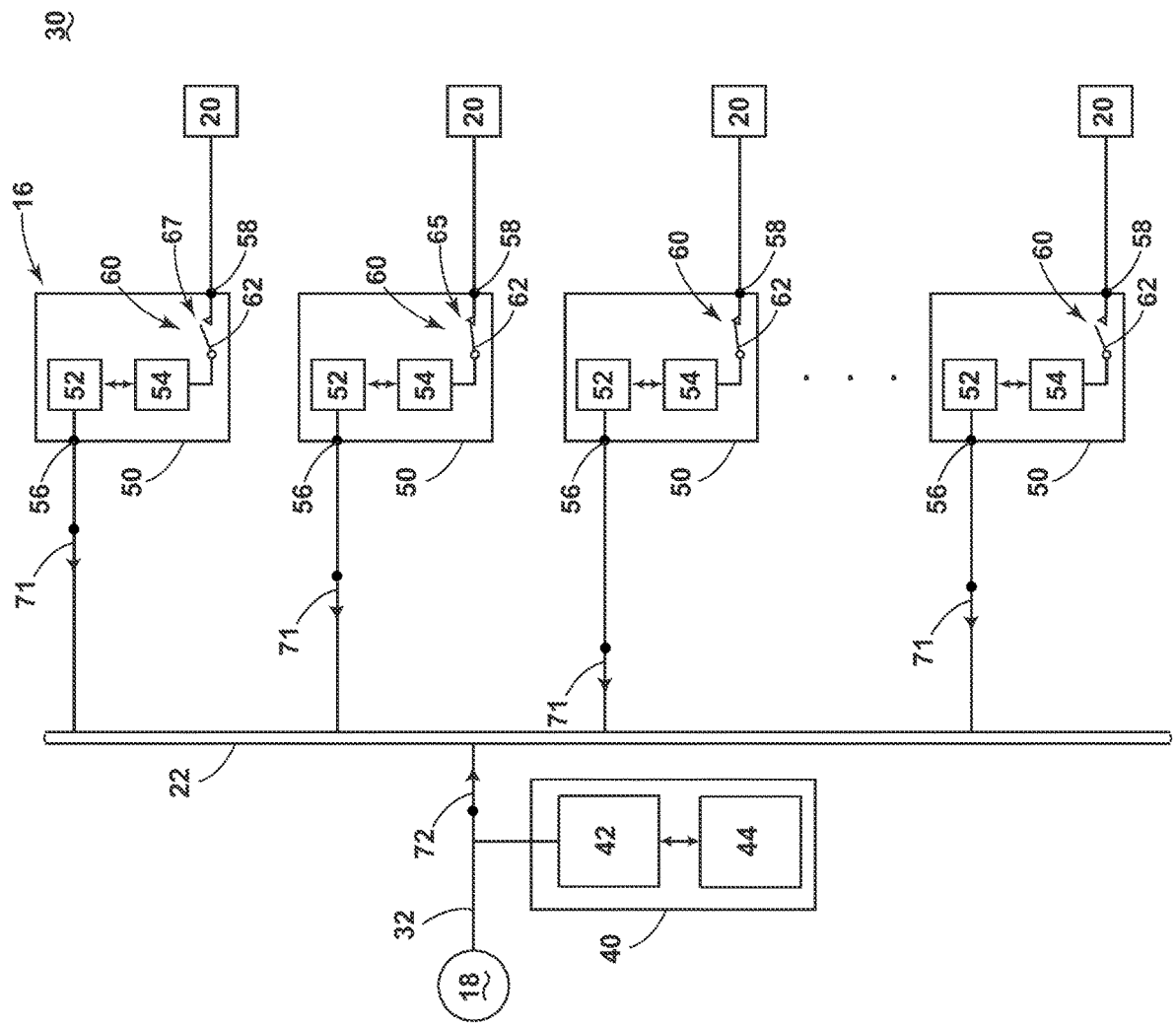
FIG. 2 is a schematic view of the power distribution system of FIG. 1 in accordance with various aspects described herein.

Referring now to FIG. 2, a schematic illustration is shown of the power distribution system 30 in accordance with various aspects described herein. The power distribution system 30 can be supplied with power from at least one power source. As shown, the power distribution system 30 is supplied with power by the generator 18, and it is understood that other power sources such as a supplemental power unit, set of batteries, additional generator, or the like can be provided. It is also understood that any number, type, or combination of power sources can be utilized to supply power to the power distribution system 30. In addition, other elements can be provided in the power distribution system 30 including such as additional switches, contactors, controllers, power sources, or the like.

The power distribution bus 22 can be supplied with power from the generator 18 by way of an electrical line 32 as shown. It is also understood that a switchable element can also be provided for selectively supplying power to, or selectively energizing, the power distribution bus 22. In an example where the power distribution system 30 includes a supplemental power source, each of the supplemental power source and the generator 18 can be independently electrically coupled to the power bus 22.

A primary communication module 40 (also referred to herein as "primary module 40") can be provided in the power distribution system 30. The primary communication module 40 can include a primary transceiver 42 and a primary controller 44.

In one example, the power bus 22 can be a controller area network (CAN) bus providing for both data and power transmission. The power bus 22 can further include a number of outputs selectively connected with a respective set or subset of secondary distribution nodes, such as the power distribution nodes 16 (FIG. 1), to define a hierarchical topography for the power distribution system 30.

The primary communication module 40 can be configured to receive and transmit data through the power bus 22. The power distribution nodes 16 can be connected to a corresponding set or subset of electrical loads 20. In an exemplary implementation, each output of the power distribution bus 22 can be selectively energized such as by way of a corresponding set of switchable elements (not shown in FIG. 2). In this manner, the primary communication module 40 can selectively supply data or power to each electrical load 20 by way of the power distribution bus 22.

A secondary communication module 50 (also referred to herein as "secondary module 50") can also be provided in the power distribution system 30. In an exemplary implementation, each power distribution node 16 can include a corresponding secondary communication module 50 such that a plurality of secondary communication modules 50 are provided. It is understood that the power distribution nodes 16 can include other elements not shown in the schematic diagram of FIG. 2, for instance additional switches, gates, contactors, controllers, power sources, or the like, in non-limiting examples.

The secondary modules 50 can be electrically coupled to corresponding electrical loads 20. As shown, one electrical load 20 is coupled to each secondary module 50 though this need not be the case. One or more electrical loads 20 can be coupled to a single secondary module 50 in some examples.

Each secondary module 50 can include a secondary transceiver 52 and a secondary controller 54. The secondary transceiver 52 can be communicatively coupled to the primary transceiver 42 by way of the power bus 22. The secondary controller 54 can be communicatively coupled to the secondary transceiver 42. In some examples, the secondary transceiver 52 and secondary controller 54 can be integrated into a single component.

It is further contemplated that each secondary module 50 can form a modular component in the power distribution system 30. In such a case, each secondary module 50 can be easily removed, replaced, or added into the power distribution system 30, thereby forming a scalable power distribution system 30 with any number of secondary modules 50.

A power input 56 and a power output 58 can also be provided in the secondary module 50. The power input 56 can receive power and data from the power bus 22. The power output 58 can supply power and data to the corresponding electrical load 20.

In one exemplary implementation, each secondary module 50 can define a circuit breaker 60 including a switch 62. The switch 62 can include any suitable switching element including, but not limited to, a solid-state switch, a FET or a MOSFET switch, or the like. In one example, the circuit breaker 60 can be in the form of a solid-state circuit breaker (SSCB) wherein the secondary transceiver 52 and switch 62 are integrated into a single chip and controllably operated by the secondary controller 54. In such a case, the secondary module 50 can define an SSCB node in the power distribution system 30.

The switch 62 can be electrically coupled with the power input 56 and the power output 58. The switch 62 can define a closed state 65 wherein the power output 58 is connected to the power input 56. The switch 62 can also define an open state 67 wherein the power output 58 is disconnected from the power input 56. The secondary controller 54 can controllably operate the switch 62 between the closed state 65 and the open state 67.

The primary transceiver 42 can be in signal communication with each secondary transceiver 52 by way of the power bus 22. An exemplary first data signal or first message 71 is shown being transmitted by one of the secondary transceivers 52. The first message 71 can be received by the primary transceiver 42. The first message 71 can include any suitable data signal such as, but not limited to, an acknowledgement signal, a ping or communication request for the primary communication module 40, a component status, a signal quality measurement, a communication signal, or the like. The first message 71 can be transmitted or passed from a corresponding load 20 to the primary communication module 40.

The first message 71 can also define a first signal characteristic. The first signal characteristic can include, in non-limiting examples, a communication frequency, a signal amplitude, a signal phase, a voltage or change in voltage, a current or change in current, or the like.

An exemplary second data signal or second message 72 is shown being transmitted by the primary transceiver 42. The second message 72 can be received by any or all of the secondary transceivers 52. For instance, the second message 72 can be transmitted by the primary transceiver 42 during operation of the power distribution system 30 for controllably operating the secondary modules 50. The second message 72 can include any suitable data signal such as, but not limited to, a control instruction to open or close the switch 62, a ping or communication request for the secondary transceiver 52, a component status, an operating status of a downstream load 20, a signal quality measurement, a communication signal, or the like. The second message 71 can be transmitted or passed to a corresponding load 20.

The second message 72 can also define a second signal characteristic. The second signal characteristic can include, in non-limiting examples, a communication frequency, a signal amplitude, a signal phase, a voltage or change in voltage, a current or change in current, or the like.

During operation, the primary module 40 can transmit instructions to the secondary modules 50 to selectively supply power to corresponding loads 20, such as by operating the corresponding circuit breakers 60, based on operational, power, or other needs of the aircraft 10. In addition, data signals or messages such as the first and second messages 71, 72, can be transmitted and received between the primary communication module 40 and the secondary communication modules 50 by way of the power distribution bus 22. In one exemplary implementation, either or both of the first message 71 or the second message 72 can include a carrier wave injected onto the power distribution bus 22. For instance, at least one of the first message 71 or the second message 72 can have a carrier amplitude or signal strength between 5 mV-2 V, including between 200 mV-1 V, in non-limiting examples.

In addition, either or both of the first or second signal characteristics can include a communication frequency of the carrier wave. In some examples, the first signal characteristic can include a first communication frequency and the second signal characteristic can include a second communication frequency. The first and second communication frequencies can be in a range between 5-30 MHz in a non-limiting example. In addition, a difference between the first communication frequency and the second communication frequency can be 100 kHz in a non-limiting example.

As data signals are transmitted between the primary module 40 and the at least one secondary module 50, a need for modifying or changing the signal characteristic can arise, such as for maintaining signal strength or improving communications between the primary and secondary communication modules 40, 50. Aspects of the disclosure provide for communication, selection, or modification of a signal characteristic to improve or maintain communications within the power distribution system 30.

In one exemplary implementation, the primary transceiver 42 can receive the first message 71 defining the first signal characteristic in the form of a first communication frequency. The primary controller 44 can be configured to compare a signal quality of the first message 71 with a quality threshold. For example, the signal quality can be in the form of a bit error ratio (BER) of the first message 71. As used herein, "bit error ratio" will refer to a number of bit errors divided by a total number of transferred bits during a given time interval. It is understood that BER values range from 0-1, with 0 indicating perfect transmission and zero bit errors present, 0.5 indicating bit errors for 50% of the bits transmitted, and 1 indicating bit errors for every bit transmitted. The quality threshold can represent a value or condition at which a change in signal characteristic is desired or beneficial. For instance, a BER exceeding $10^{-6}$, $10^{-9}$, $10^{-11}$, or $10^{-13}$, in non-limiting examples, can indicate a need to improve signal quality. It is understood that a change in signal characteristic can improve signal quality including, but not limited to, a change in communication frequency, a change in carrier signal amplitude, a change in signal phase, or the like, or combinations thereof.

The primary controller 44 can also repeat the BER evaluation for each secondary communication module 50 in the power distribution system 30. Furthermore, the primary controller 44 can compare BER values between secondary communication modules 50, such as to evaluate variability in BER across the power distribution system 30. In one example, the quality threshold can represent a condition wherein a BER for every secondary communication module 50 ensures compliance with the Radio Technical Commission for Aeronautics (RTCA) DO-160 communication standard.

When a need to improve the signal quality is indicated, the primary communication module 40 can initiate a change in signal characteristic for any or all of the secondary modules 50. For instance, the primary controller 44 can initiate a process of selecting a new or second communication frequency for communication with all secondary modules 50. A range of available frequencies for the first or second communication frequencies can include, but is not limited to, 2-200 MHz, 5-150 MHz, 5-100 MHz, 5-50 MHz, or 5-30 MHz. In one example, the first and second communication frequency can differ by 100 kHz though this need not be the case. Sequential changes in communication frequency can also be performed in 100 kHz steps, 50 kHz steps, 25 kHz steps, or 10 kHz steps, in non-limiting examples.

The primary transceiver 42 can then transmit a second message 72 to all secondary modules 50. The second message 72 can define a second signal characteristic in the form of the second communication frequency. For instance, the second message 72 can be transmitted at the first communication frequency and include an ID field identifying each secondary communication module 50, a frequency change command, and a data field containing the second communication frequency, whereby the data field defines the second signal characteristic. Each secondary module 50 can receive the second message 72 with the second signal characteristic.

It is understood that signals transmitted over the power distribution system 30, including the first message 71 and second message 72, can conform to a variety of communication protocols based on predetermined industry standards. In some examples, the power bus 22 can comprise a controller area network (CAN) bus and the first and second messages 71, 72 can conform to CAN protocols, though this need not be the case. Other communication interfaces or protocols can be implemented in the power distribution system 30, including local interconnect network (LIN), universal asynchronous transmitter and receiver (UART), RS-485, or the like, or combinations thereof.

A double-handshake validation can additionally be performed after transmitting the second message 72. For instance, the secondary modules 50 can transmit an acknowledgement or response message to the primary module 40 confirming receipt of the second message 72. The primary module 40 can receive the acknowledgment message from all secondary modules 50, after which point the primary module 40 and the secondary modules 50 can change to the second signal characteristic (e.g. change to the second communication frequency). In one non-limiting example the primary module 40 and secondary modules 50 can, after respective receipt or transmission of the acknowledgement message, wait a predetermined amount of time (e.g. 10 seconds) before changing to the second signal characteristic.

A communication test can also be performed to determine communication performance at the new communication frequency. For instance, the primary module 40 can transmit a test or request message to at least one secondary module 50 or to all secondary modules 50 in the plurality of secondary modules 50. The at least one secondary module 50 can receive the test message and determine a signal quality, such as a BER, of the test message. The determined signal quality can be transmitted as a test response back to the primary module 40 for further evaluation. If the signal quality for all secondary modules 50 is found to have satisfactory data performance, then the second signal characteristic can continue to be utilized for future communications across the power distribution system 30. If unsatisfactory data or communication performance is determined, the above-described procedure, including receiving the first message and transmitting the second message, can be repeated for a new signal characteristic (e.g. a new communication frequency) in one non-limiting example, or repeated after reverting to the first communication frequency in another non-limiting example, until a suitable signal quality is established. In this manner, the secondary controller 54 can be configured to transmit a signal to the primary controller 44 indicative of at least one of a communication frequency of a communication status.

In an example where communication is dropped between the primary module 40 and a secondary module 50, a restoration procedure can be performed in the power distribution system 30 to re-establish communications. For instance, in one non-limiting example the primary controller 44 and secondary controller 54 can each, independently, determine that communication has been lost with the other, e.g. by lack of received transmission for greater than a predetermined time interval. When communication loss has been determined by the primary module 40, the primary module 40 can initiate a switch to a predetermined frequency and wait for a signal from the lost secondary module 50. When communication loss has been determined by the secondary module 50, the lost secondary module 50 can perform a frequency sweep over a predetermined range until communication is restored. In some implementations, the predetermined range can be 2-200 MHz, including between 5-150 MHz, including between 5-100 MHz, including between 5-50 MHz, including between 5-30 MHz. In some implementations, the frequency sweep can be performed at discrete steps or increments, e.g. in 10 kHz increments, 50 kHz increments, 100 kHz increments, or 200 kHz increments, in non-limiting examples. The frequency sweep can also be performed in a continuous manner over the predetermined range without incrementing over discrete steps. At each selected frequency over the sweep, the secondary module 50 can transmit a test signal to the primary module 40 until the test signal is received and communication is restored. It is understood that other communication restoration procedures can be performed or implemented in the power distribution system 30.

Figure 3:
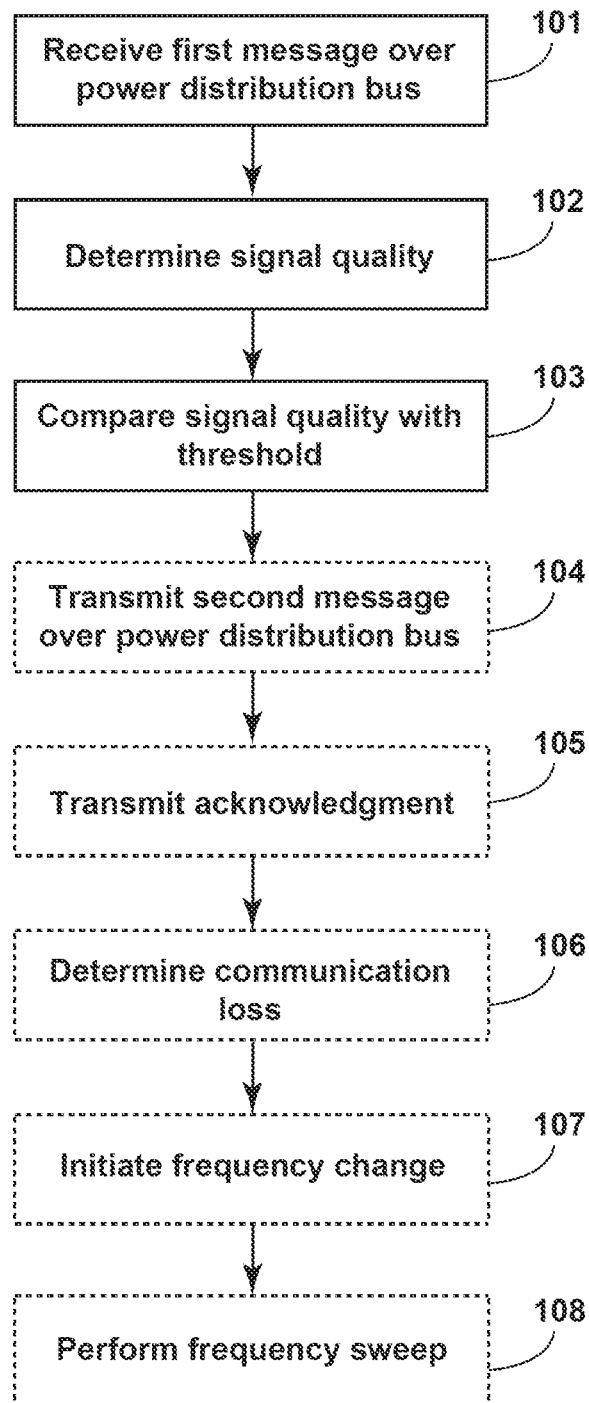
FIG. 3 is a flowchart illustrating a method of operating the power distribution system of FIG. 1 in accordance with various aspects described herein.

Referring now to FIG. 3, a method 100 of operating the power distribution system 30 is shown. The method 100 includes at step 101 receiving, at the primary communication module 40, the first message 71 at the first communication frequency over the power distribution bus 22 from at least one of the secondary communication modules 50 in the plurality of secondary communication modules 50. The method 100 includes at step 102 determining, by the primary communication module 40, a signal quality of the first message 71. In some examples, the signal quality can include a bit error ratio as described above. The method 100 includes at step 103 comparing, by the primary communication module 40, the determined signal quality with a signal quality threshold indicative of a need to improve the signal quality.

Optionally, the method 100 can include at step 104 transmitting, by the primary communication module 40, the second message 72 to the plurality of secondary communication modules 50 when the need to improve signal quality is indicated. The second message 72 can include a frequency change command and a second communication frequency as described above. Optionally, the method 100 can include at 105 transmitting, by the at least one secondary communication module 50, an acknowledgement message indicative of successful receipt of the second message 72 as described above. Optionally, the method 100 can include at step 106 determining, by the primary communication module 40, a communication loss of a secondary communication module 50. Optionally, the method 100 can include at step 107 initiating, by the primary communication module 50, a change in communication frequency to a predetermined value when the communication loss is determined. Optionally, the method 100 can include at step 108 performing a frequency sweep by the secondary communication module 50 when the communication loss is determined.

Figure 4:
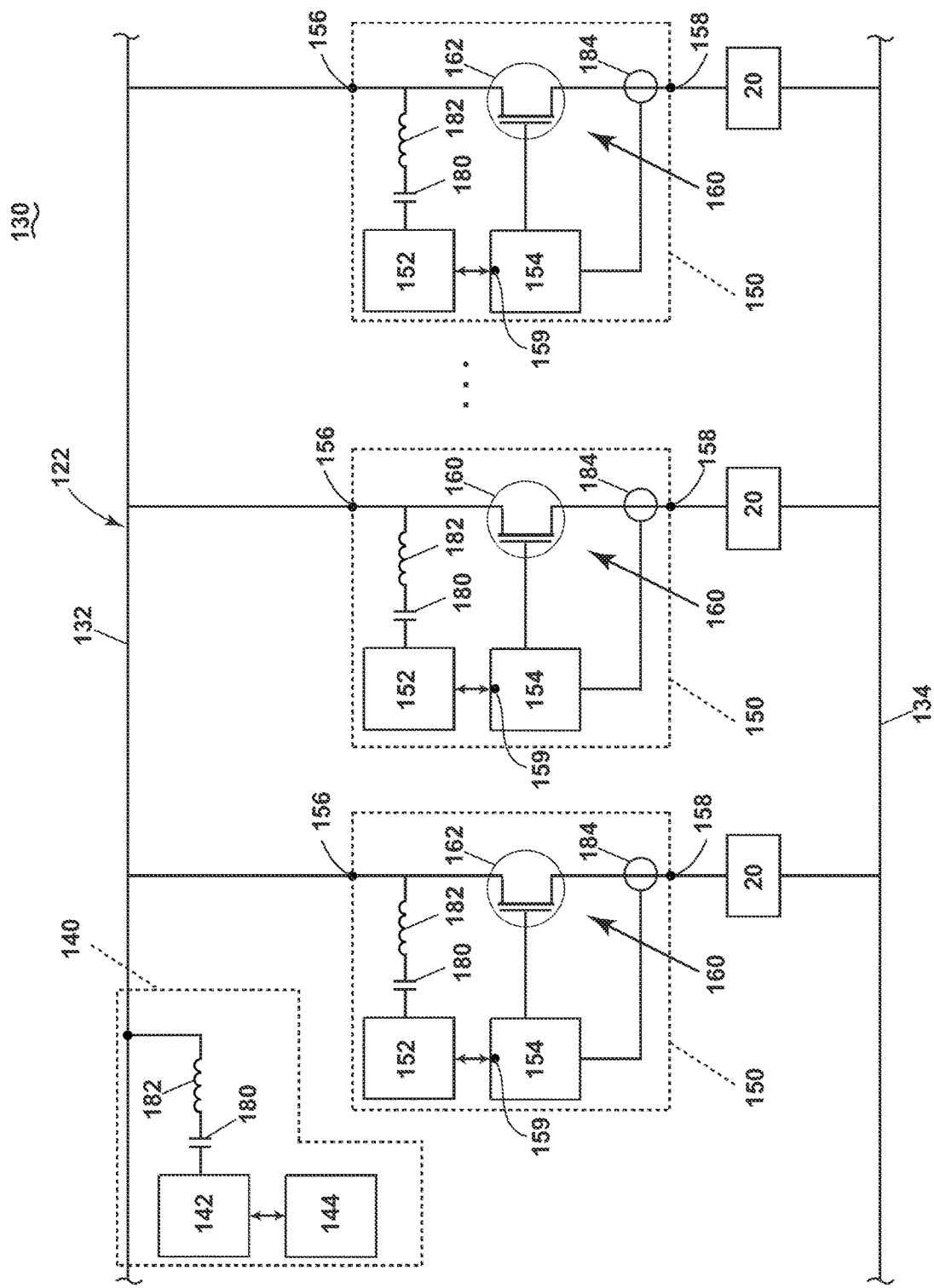
FIG. 4 is a schematic view of another power distribution system that can be utilized in the aircraft of FIG. 1 in accordance with various aspects described herein.

Turning to FIG. 4, one exemplary implementation of a power distribution system 130 is illustrated that can be utilized in the aircraft 10. The power distribution system 130 is similar to the power distribution system 30; therefore, like parts will be identified with like numerals increased by 100, with it being understood that the description of the like parts of the power distribution system 30 applies to the power distribution system 130, unless noted otherwise.

The power distribution system 130 includes a primary communication module 140 and a plurality of secondary communication modules 150. A power distribution bus 122 can be provided and is illustrated with electrical lines including a supply line 132 and a return line 134. For instance, the supply line 132 and return line 134 can have respective voltages of +28 V and 0 V in a non-limiting example.

As shown, the primary module 140 can include a primary transceiver 142 and a primary controller 144, and each secondary module 150 can include a secondary transceiver 152, a secondary controller 154, a power input 156, and a power output 158. Electrical loads 20 can be coupled to each secondary communication module 150.

The primary module 140 and the at least one secondary module 150 can further include a coupling capacitor 180 and an inductor 182, such as a ferrite bead. In addition, each secondary module 150 can include a circuit breaker 160 and switch 162 coupled with the power input 156 and the power output 158. As shown, the switch 162 is in the form of a FET switch. A current sensor 184 can also be provided and coupled to the secondary controller 154 for monitoring a current supplied to the load 20.

During operation, the primary module 140 can transmit instructions to the secondary modules 150 to selectively supply power to corresponding loads 20, such as by operating the corresponding circuit breakers 160 and switches 162, based on operational needs or power needs of the aircraft 10. Data signals or messages similar to the first and second messages 71, 72 (FIG. 2) can be transmitted and received between the primary communication module 140 and the secondary communication modules 150 by way of the power distribution bus 122 including the supply and return lines 132, 134. Current loads through the at least one secondary module 150 can be monitored by the primary module 140 by way of the current sensors 184. The coupling capacitors 180 and inductors 182 can provide for blocking of undesired DC signals or interference while allowing AC power to pass through along with any injected carrier wave for communication between elements of the power distribution system 130. It is understood that other components can be provided, such as one or more transformers for isolation of communication signals e.g. the first or second messages 71, 72 (FIG. 2) from background noise. For instance, transformer coupling can be utilized for higher-voltage power distribution buses or power lines, such as higher than 48V, or higher than 270V, in non-limiting examples.

In addition, the primary communication module 140 can initiate a change in signal characteristic, including a change in communication frequency, as described above. The primary module 140 can also determine a communication loss with the at least one secondary module 150 as described above.

In one non-limiting example of operation, each secondary controller 154 can be configured to determine the presence of signal interference at a current communication frequency with the primary communication module 140. For instance, each secondary controller 145 can include an interface pin 159 for indicating the presence of interference. The interface pin 159 can form a digital output for each secondary controller 154 that is "high" when an interference signal is detected by that secondary controller 154. The primary communication module 140 can read the interface pin 159 for each secondary controller 154, thereby receiving signal interference data from each secondary controller 154. The primary communication module 140 can perform additional signal quality determinations, such as an average signal interference across all secondary modules 150, or a bit error ratio in combination with signal interference for each secondary module 150, or the like. The primary module can initiate a change in signal characteristic based on either or both of a bit error ratio or the interference data from the interface pins 159, in a non-limiting example.

Many other possible aspects and configurations in addition to that shown in the above figures are contemplated by the present disclosure. The aspects disclosed herein provide a method and power distribution system operable in a dynamic-load state with multiple loads being switched on and off during operation. The technical effect is that the above described aspects enable the power distribution system to be able to dynamically distribute and control power to a large number of electrical loads using data over power transmission, while also improving communications between nodes of the power distribution system in view of changing power demands and communication signal quality.

Aspects of the disclosure provide for several benefits, including a robust communication system independent of network conditions under external noise, for example from motor-type loads, load switchings, faults, AC signal attenuation from power supplies, or the like. Aspects of the disclosure further provide for scalability of the power distribution system as SSCB nodes can be added or deleted from the communication network without degrading the system's performance. Aspects of the disclosure further provide for a software solution to optimally select frequency without need of additional hardware circuitry for determination of signal quality or BER measurements. Use of a double handshake procedure between the primary and secondary modules provides for implementation of a change in carrier frequency while avoiding communication loss with SSCB nodes in the network, leading to a more stable and robust communication system.

Furthermore, the ability to utilize drop-in replacement for the secondary modules or SSCB nodes provides for easy upgradation of the network, in addition to improved serviceability and scalability for any size power distribution system. Aspects provide for an intelligent power management wherein existing electrical power can be routed to loads or switched off as needed, with dynamic communication established or maintained between nodes of the network.

This written description uses examples to disclose embodiments of the disclosure, including the best mode, and also to enable any person skilled in the art to practice embodiments of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

An aircraft power distribution system, comprising: a power distribution bus supplying power along an electrical line; a primary communication module comprising a primary transceiver and a primary controller, with the primary transceiver configured to receive and transmit data through the power distribution bus; and a plurality of secondary communication modules, each secondary communication module in the plurality of secondary communication modules comprising: a power input receiving power and data from the power distribution bus; a power output supplying at least power to a load; a secondary transceiver communicatively coupled to the primary transceiver by way of the power distribution bus; and a secondary controller communicatively coupled to the secondary transceiver; wherein the primary communication module is configured to: receive a first message from the secondary communication module defining a first signal characteristic; compare a signal quality of the first message with a quality threshold indicative of a need to improve the signal quality; and transmit a second message to the secondary communication module defining a second signal characteristic when the need to improve the signal quality is indicated.

An aircraft power distribution system, comprising a power distribution bus supplying power along an electrical line; a primary communication module comprising a primary transceiver and a primary controller, with the primary transceiver configured to receive and transmit data through the power distribution bus; and a plurality of secondary communication modules, each secondary communication module in the plurality of secondary communication modules comprising: a power input receiving power and data from the power distribution bus; a power output supplying at least power to a load; a secondary transceiver communicatively coupled to the primary transceiver by way of the power distribution bus; and a secondary controller communicatively coupled to the secondary transceiver; wherein the primary communication module is configured to: receive a first message at a first communication frequency from a secondary communication module in the plurality of secondary communication modules; and compare a signal quality of the first message with a quality threshold indicative of a need to improve the signal quality.

The aircraft power distribution system of any preceding clause, wherein the primary communication module is further configured to transmit a second message to the plurality of secondary communication modules when the need to improve the signal quality is indicated.

The aircraft power distribution system of any preceding clause, wherein the primary communication module is further configured to transmit data through the power distribution bus based on the first signal characteristic.

The aircraft power distribution system of any preceding clause, wherein the signal quality comprises a bit error ratio, and wherein the need to improve the signal quality is indicated when the bit error ratio is in a range between $10^{-9}$-1.

The aircraft power distribution system of any preceding clause, wherein the first signal characteristic comprises a first communication frequency.

The aircraft power distribution system of any preceding clause, wherein the second signal characteristic comprises a second communication frequency.

The aircraft power distribution system of any preceding clause, wherein the second signal comprises an ID field identifying a secondary communication module in the plurality of secondary communication modules, a frequency change command, and a data field containing the second communication frequency, whereby the primary communication module and the plurality of secondary communication modules all communicate using the second communication frequency.

The aircraft power distribution system of any preceding clause, wherein the first communication frequency is in a range between 5-30 MHz.

The aircraft power distribution system of any preceding clause, wherein the second communication frequency is in a range between 5-30 MHz.

The aircraft power distribution system of any preceding clause, wherein a difference between the first communication frequency and the second communication frequency is 100 kHz.

The aircraft power distribution system of any preceding clause, wherein at least one of the first message or the second message has a signal amplitude between 5 mV-2 V.

The aircraft power distribution system of any preceding clause, wherein each secondary communication module in the plurality of secondary communication modules comprises a circuit breaker with a switch coupled with the power input and the power output, the switch being operable between a closed state wherein the power output is connected to the power input and an open state wherein the power output is disconnected from the power input.

The aircraft power distribution system of any preceding clause, wherein the secondary controller is controllably coupled to the switch, and wherein the primary transceiver is configured to transmit an instruction signal to the secondary transceiver to operate the switch.

The aircraft power distribution system of any preceding clause, wherein the secondary transceiver and the switch are integrated into a single solid-state chip such that the secondary communication module defines a solid-state circuit breaker.

The power distribution system of any preceding clause, wherein each of the first and second messages comprises a carrier wave injected onto the power distribution bus.

The aircraft power distribution system of any preceding clause, wherein at least one of the first and second signal characteristics comprises a communication frequency of the carrier wave.

The aircraft power distribution system of any preceding clause, wherein each of the first and second signal characteristics comprises a communication frequency of the carrier wave.

The aircraft power distribution system of any preceding clause, wherein the secondary controller comprises an interface pin configured to supply the first message to the primary communication module, with the first message comprising interference data.

A circuit breaker module for an aircraft power distribution system, comprising: a power input configured to receive power and data from a power distribution bus; a power output configured to supply at least power to a load; a transceiver configured for signal communication with a primary controller in the aircraft power distribution system by way of the power distribution bus; a circuit breaker comprising a power switch coupled with the power input and the power output and operable between a closed state wherein the power output is connected to the power input, and an open state wherein the power output is disconnected from the power input; and a controller communicatively coupled with the circuit breaker and the transceiver, the controller configured to operate the switch based on a controller signal received by the transceiver from the primary controller.

The circuit breaker module of any preceding clause, wherein the controller is further configured to transmit a signal to the primary controller in the aircraft power distribution system indicative of at least one of a communication frequency or a communication status.

A method of operating a power distribution system, the method comprising: receiving, at a primary communication module, a first message over a power distribution bus from at least one secondary communication module in a plurality of secondary communication modules, the first message defining a first signal characteristic; determining, by the primary communication module, a signal quality of the first message; comparing, by the primary communication module, the determined signal quality with a signal quality threshold indicative of a need to improve the signal quality; and transmitting, by the primary communication module, a second message to the at least one secondary communication module when the need to improve the signal quality is indicated, the second message defining a second signal characteristic.

A method of operating an aircraft power distribution system, the method comprising: receiving, at a primary communication module, a first message at a first communication frequency over a power distribution bus from at least one secondary communication module in a plurality of secondary communication modules; determining, by the primary communication module, a signal quality of the first message; and comparing, by the primary communication module, the signal quality with a signal quality threshold indicative of a need to improve the signal quality.

The method of any preceding clause, further comprising transmitting, by the primary communication module, a second message to the at least one secondary communication module when the need to improve the signal quality is indicated, the second message comprising a frequency change command and a second communication frequency.

The method of any preceding clause, wherein the first signal characteristic comprises a first communication frequency.

The method of any preceding clause, wherein the signal quality comprises a bit error ratio.

The method of any preceding clause, wherein the second signal characteristic comprises a second communication frequency.

The method of any preceding clause, further comprising transmitting, by the at least one secondary communication module, a response message indicative of successful receipt of the second message.

The method of any preceding clause, further comprising transmitting, by the primary communication module, a request message with the second signal characteristic to the at least one secondary communication module.

The method of any preceding clause, further comprising transmitting, by the at least one secondary communication module, a response message to the primary communication module based on the request message.

The method of any preceding clause, further comprising determining, by the at least one secondary communication module, a second signal quality of the response message.

The method of any preceding clause, further comprising transmitting, by the at least one secondary communication module, the second signal quality to the primary communication module.

The method of any preceding clause, further comprising determining a communication loss by each of the primary communication module and the at least one secondary communication module.

The method of any preceding clause, further comprising initiating, by the primary communication module, a change in communication frequency to a predetermined value when the communication loss is determined.

The method of any preceding clause, further comprising performing, by the at least one secondary communication module, a frequency sweep when the communication loss is determined until the communication frequency reaches the predetermined value and communication is restored.

The method of any preceding clause, wherein the second signal comprises an ID field identifying a secondary communication module in the plurality of secondary communication modules, a frequency change command, and a data field containing the second communication frequency.

The method of any preceding clause, further comprising repeating at least the receiving, the determining the signal quality, and the comparing for each secondary communication module in the plurality of secondary communication modules.

What is claimed is:

1. An aircraft power distribution system, comprising:
   a power distribution bus supplying power along an electrical line;
   a primary communication module comprising a primary transceiver and a primary controller, with the primary transceiver configured to receive and transmit data through the power distribution bus; and
   a plurality of secondary communication modules, each secondary communication module in the plurality of secondary communication modules comprising:
   a power input receiving power and data from the power distribution bus;
   a power output supplying at least power to a load;

a secondary transceiver communicatively coupled to the primary transceiver by way of the power distribution bus; and a secondary controller communicatively coupled to the secondary transceiver;

wherein the primary communication module is configured to:

receive a first message at a first communication frequency from a secondary communication module in the plurality of secondary communication modules; and compare a signal quality of the first message with a quality threshold indicative of a need to improve the signal quality.

2. The aircraft power distribution system of claim 1, wherein the signal quality comprises a bit error ratio, and wherein the need to improve the signal quality is indicated when the bit error ratio is in a range between $10^{-9}$-1.

3. The aircraft power distribution system of claim 1, wherein the primary communication module is further configured to transmit a second message to the plurality of secondary communication modules when the need to improve the signal quality is indicated.

4. The aircraft power distribution system of claim 3, wherein the second message comprises an ID field identifying a secondary communication module in the plurality of secondary communication modules, a frequency change command, and a data field containing a second communication frequency, whereby the primary communication module and the plurality of secondary communication modules all communicate using the second communication frequency.

5. The aircraft power distribution system of claim 4, wherein at least one of the first communication frequency or the second communication frequency is in a range between 5-30 MHz.

6. The aircraft power distribution system of claim 4, wherein a difference between the first communication frequency and the second communication frequency is 100 kHz.

7. The aircraft power distribution system of claim 3, wherein at least one of the first message or the second message has a signal amplitude between 5 mV-2 V.

8. The aircraft power distribution system of claim 1, wherein each secondary communication module in the plurality of secondary communication modules comprises a circuit breaker with a switch coupled with the power input and the power output, the switch being operable between a closed state wherein the power output is connected to the power input and an open state wherein the power output is disconnected from the power input.

9. The aircraft power distribution system of claim 8, wherein the secondary controller is controllably coupled to the switch, and wherein the primary transceiver is configured to transmit an instruction signal to the secondary transceiver to operate the switch.

10. The aircraft power distribution system of claim 9, wherein the secondary transceiver and the switch are integrated into a single solid-state chip such that the secondary communication module defines a solid-state circuit breaker.

11. A method of operating an aircraft power distribution system, the method comprising:

receiving, at a primary communication module, a first message at a first communication frequency over a power distribution bus from at least one secondary communication module in a plurality of secondary communication modules;

determining, by the primary communication module, a signal quality of the first message; and comparing, by the primary communication module, the signal quality with a signal quality threshold indicative of a need to improve the signal quality.

12. The method of claim 11, further comprising transmitting, by the primary communication module, a second message to the at least one secondary communication module when the need to improve the signal quality is indicated, the second message comprising a frequency change command and a second communication frequency.

13. The method of claim 12, wherein the second message comprises an ID field identifying a secondary communication module in the plurality of secondary communication modules, the frequency change command, and a data field containing the second communication frequency.

14. The method of claim 12, further comprising transmitting, by the at least one secondary communication module, an acknowledgment message indicative of successful receipt of the second message.

15. The method of claim 12, further comprising:

transmitting, by the primary communication module, a request message with the second communication frequency to the at least one secondary communication module;

transmitting, by the at least one secondary communication module, a response message to the primary communication module based on the request message;

determining, by the at least one secondary communication module, a second signal quality of the response message; and transmitting, by the at least one secondary communication module, the second signal quality to the primary communication module.

16. The method of claim 11, further comprising:

determining a communication loss by each of the primary communication module and the at least one secondary communication module;

initiating, by the primary communication module, a change in communication frequency to a predetermined value when the communication loss is determined; and performing, by the at least one secondary communication module, a frequency sweep when the communication loss is determined until the communication frequency reaches the predetermined value and communication is restored.

17. The method of claim 11, wherein each secondary communication module in the plurality of secondary communication modules comprises a circuit breaker.

18. The method of claim 11, further comprising repeating the receiving, the determining the signal quality, and the comparing for each secondary communication module in the plurality of secondary communication modules.

* * * * *